(No Model.)
E. KEMPSHALL.
LACING HOOK.
No. 553,165. Patented Jan. 14, 1896.
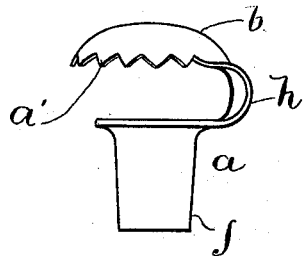
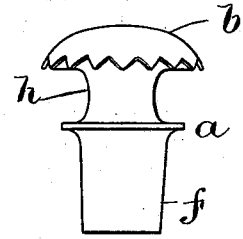
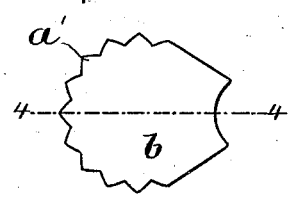
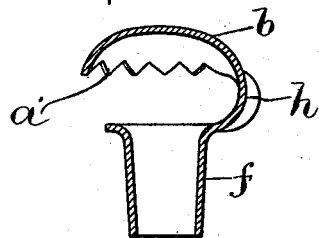
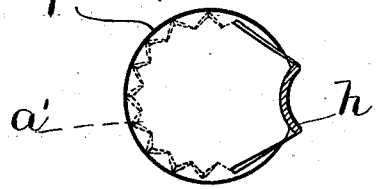
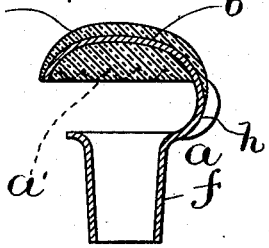
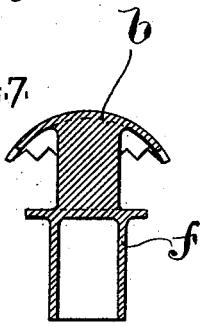
WITNESSES:
INVENTOR:

UNITED STATES PATENT OFFICE.

ELEAZER KEMPSHALL, OF NEWTON, ASSIGNOR TO THEOPHILUS KING, TRUSTEE, OF BOSTON, MASSACHUSETTS.

LACING-HOOK.

SPECIFICATION forming part of Letters Patent No. 553,165, dated January 14, 1896.

Application filed November 4, 1895. Serial No. 567,825. (No model.)

*To all whom it may concern:*

Be it known that I, ELEAZER KEMPSHALL, of Newton, in the county of Middlesex and State of Massachusetts, have invented certain new and useful Improvements in Lacing-Hooks, of which the following is a specification.

This invention relates to a new and useful improvement in lacing-hooks; and it consists in the novel features of construction and relative arrangement of parts hereinafter fully described in the specification, clearly illustrated in the drawings, and particularly pointed out in the claims.

Reference is to be had to the accompanying sheet of drawings, forming a part of this application, in which like characters are used to indicate like parts wherever they occur.

Figure 1 represents in side elevation the metal portion of my improved eyelet. Fig. 2 represents a front elevation thereof. Fig. 3 represents an inverted plan view of the top of the metal part of the eyelet with the shank portion thereof removed. Fig. 4 represents a longitudinal sectional view thereof on the line 4 4 of Fig. 3. Fig. 5 represents an inverted plan view of the head of the complete hook with the shank portion removed. Fig. 6 represents in longitudinal section a hook made in accordance with my invention. Fig. 7 represents in sectional view a post lacing-stud made in accordance with my invention.

The object of my invention is to provide a sheet-metal lacing stud or hook, having its head practically covered with a composition, said sheet-metal head being dome-shaped and concaved on its under side, and provided with spurs or projections on its edge adapted to rest upon a die-plate, so that the composition may be forced between said spurs to fill up the under side of said metal head, the spurs acting to prevent the wearing away of the under side of the head and permitting the union of the composition on the out and in side of the metal head. The composition is thus firmly anchored to the metal head and an unobstructed opening provided for the insertion or removal of the lacing.

In carrying out my invention I form a metal lacing stud or hook $a$ with a head $b$, and any desired securing means for attaching said hook to a shoe or other article, here shown as a tubular body $f$. A neck portion $h$ connects the head $a$ with the part or member $f$. The head $a$ I form dome-shaped with a recessed under side. The edge of the head I form with one or more spurs or projections $a'$ that are adapted to rest upon a die-plate, thereby forming supports for the head and at the same time providing an opening or openings through which the composition may be forced to fill up the recess on the under side of the head. The outer and inner coverings are firmly bound to each other and to the head by the parts of the covering between the spurs $a'$.

It will be noted that only the ends of the spurs show through the composition, (see Figs. 5 and 6,) so that while the under side of the composition is protected from wear by the metal spurs, yet these spurs are practically concealed from view.

The length, shape and number of the spurs may be varied, as desired, without departing from the spirit and scope of my invention, which includes a metal lacing-hook having a dome-shaped head with a recessed under side and an irregular edge with or without a covering.

Having thus explained the nature of my invention and described a way of constructing and using the same, though without attempting to set forth all of the forms in which it may be made or all of the modes of its use, what I claim, and desire to secure by Letters Patent, is—

1. A lacing stud or hook comprising in its construction a dome-shaped metal head having a recessed under side, one or more spurs or projections formed on the edge of said head, and a securing member connected to said head, substantially as and for the purpose set forth.

2. A lacing hook or stud comprising in its construction a dome-shaped metal head recessed on its under side, spurs formed upon the edge of said head, a covering of plastic material molded about said top on both sides thereof, and filling the concave under side thereof flush with the said spurs, the material on the top and bottom of said head being connected in the spaces between said spurs, said covering having a flat under surface, that is surrounded and protected by said spurs, an oval top, and a securing member connected to said head, substantially as and for the purpose set forth.

In testimony whereof I have signed my name to this specification, in the presence of two subscribing witnesses, this 30th day of October, A. D. 1895.

ELEAZER KEMPSHALL.

Witnesses:
E. BATCHELDER,
A. D. HARRISON.